J. J. MARSTALL.
GROOVING MACHINE.
APPLICATION FILED SEPT. 19, 1913.
1,084,460.
Patented Jan. 13, 1914.
2 SHEETS—SHEET 1.
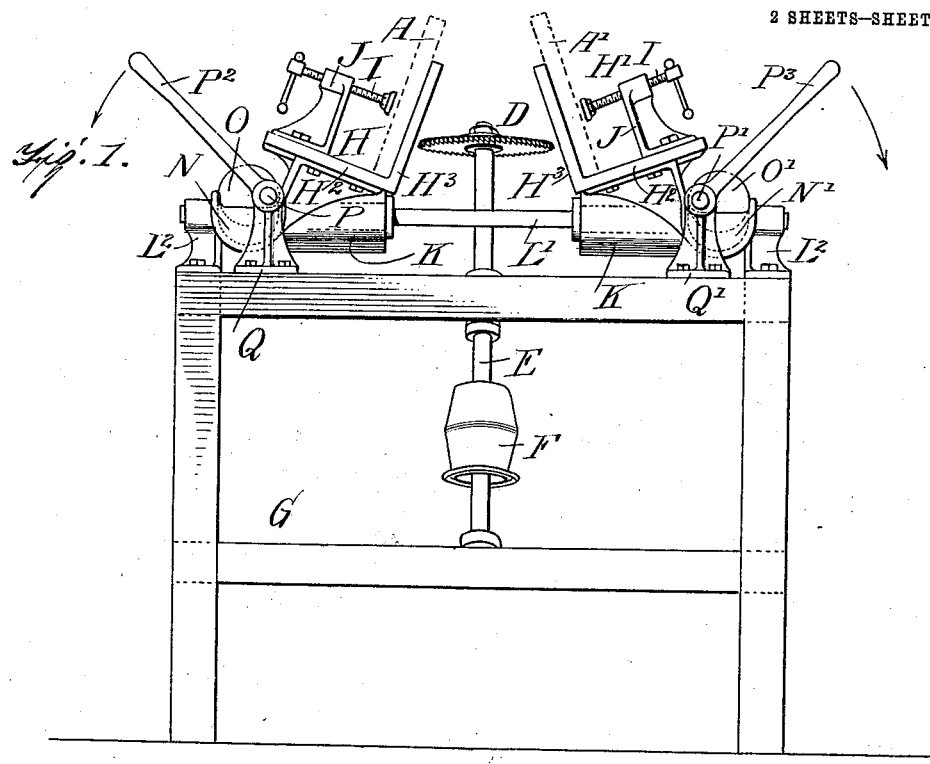
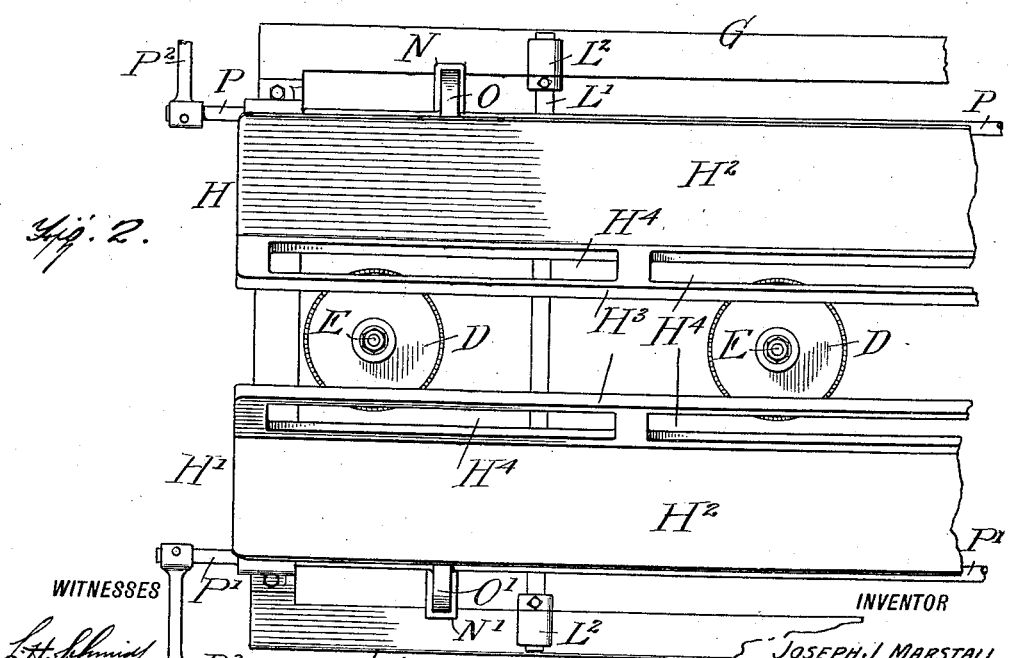
WITNESSES
INVENTOR
JOSEPH J. MARSTALL
BY
ATTORNEYS

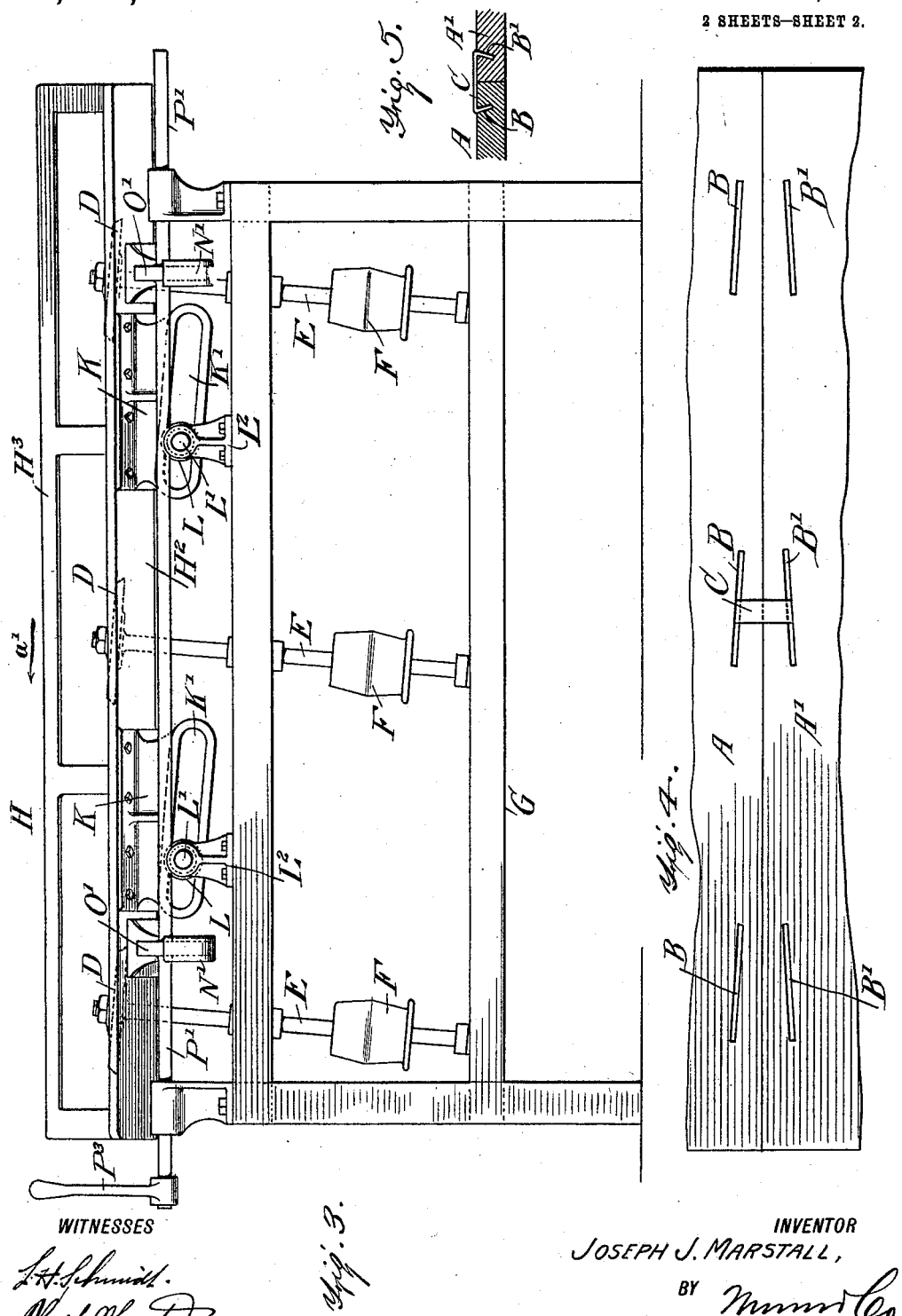

UNITED STATES PATENT OFFICE.

JOSEPH J. MARSTALL, OF HENDERSON, KENTUCKY.

GROOVING-MACHINE.

1,084,460.  Specification of Letters Patent.  Patented Jan. 13, 1914.

Application filed September 19, 1913. Serial No. 790,686.

*To all whom it may concern:*

Be it known that I, JOSEPH J. MARSTALL, a citizen of the United States, and a resident of Henderson, in the county of Henderson and State of Kentucky, have invented a new and Improved Grooving-Machine, of which the following is a full, clear, and exact description.

The invention relates to woodworking machines, and its object is to provide a new and improved grooving machine more especially designed for simultaneously forming pairs of diverging grooves in two boards or other pieces of stock.

In order to accomplish the desired result use is made of an inclined rotary cutter, carriages on opposite sides of the said cutter for supporting two pieces of stock, means for moving the carriages toward and from the said cutter, and means for guiding the carriages lengthwise at an angle corresponding to that of the rotary cutter to cause the cutter to form a pair of diverging grooves in the opposite faces of the pieces of stock.

A practical embodiment of the invention is represented in the accompanying drawings forming a part of this specification, in which similar characters of reference indicate corresponding parts in all the views.

Figure 1 is an elevation of one end of the grooving machine; Fig. 2 is a plan view of the same; Fig. 3 is a side elevation of the machine; Fig. 4 is a plan view of the two pieces of stock provided with pairs of diverging grooves and clamps engaging the grooves for holding the two pieces of stock joined together, and Fig. 5 is a cross section of the same.

In the manufacture of furniture and the like use is made of pieces of stock A, A' provided with pairs of diverging angular grooves B, B' (see Figs. 4 and 5) to permit of conveniently joining the two pieces together by the use of a clamp C engaging the grooves B, B'. In order to provide the two pieces of stock to be joined simultaneously with one or more pairs of grooves B, B' which diverge relative to the length of the stock and are angular or inclined rela-
tive to the face of the stock use is made of a grooving machine presently to be described in detail. As shown in Fig. 3, use is made of three rotary cutters D, of any approved construction, and secured on the upper ends of spindles E provided with pulleys F connected by belt with other machinery for rotating the said spindles E and their cutters D. The spindles E are journaled in a main frame G and their axes extend in the same vertical plane and are slightly inclined, as plainly indicated in Fig. 3, so that the cutters D are held in corresponding positions.

The pieces of stock A, A' are supported on carriages H, H' extending lengthwise of the machine and located on opposite sides of the cutters D, and the said carriages H, H' are provided with inclined bases $H^2$ on which rest the pieces of stock A, A', and the said carriages are provided with perforated supports $H^3$ extending upward from the bases $H^2$ and inclined toward each other, as plainly indicated in Fig. 1, so that the opposite faces of the pieces of stock A, A' resting on the said supports $H^3$ are inclined toward each other, as will be readily understood by reference to Fig. 1. The supports $H^3$ are provided with openings or perforations $H^4$ for the passage of the cutters D at the time the carriages H, H' are moved toward each other, to allow the cutters to cut the grooves B, B' in the opposite faces of the pieces of stock A, A'. The pieces of stock A, A' are clamped in position against the supports $H^3$ by screw clamps I screwing in brackets J attached to the bases $H^2$ of the carriages H, H'.

The carriages H, H' are provided at their bases $H^2$ with depending bearings K having slots K' inclined in a longitudinal direction, the incline corresponding to that of the cutters D (see Fig. 3). The bearings K are arranged in pairs on the carriages H, H' and the slots K' of each pair of bearings are engaged by friction rollers L held on a transverse shaft L' journaled in suitable brackets $L^2$ secured to the main frame G. On the operator moving the carriages H, H' forward in the direction of the arrow $a'$ they are caused to travel upwardly and forwardly so that the cutters D cut the grooves B, B' in oblique directions, as indicated in Fig. 4.

The bases $H^2$ of the carriages H, H' are provided with bearings or guideways N, N' engaged by eccentrics O, O' secured on shafts P, P' journaled and mounted to slide longitudinally in suitable bearings Q, Q' secured on the main frame G. The shafts P, P' are provided at one end with a handle $P^2$, $P^3$ under the control of the operator for turning the shafts P and P' and with them the eccentrics O, O' to move the carriages H, H' transversely toward and from each other with a view to move the opposite faces of the pieces of stock A, A' into and out of engagement with the cutters D.

In using the machine the pieces of stock A and A' are clamped in position on the carriages H, H' by the use of screw clamps I, and then the operator swings the handles $P^2$, $P^3$ downward to cause the carriages H, H' to move transversely toward each other with a view to engage the opposite faces of the pieces of stock A, A' with the cutters D at opposite sides thereof. The operator then moves the carriages H, H' forward in the direction of the arrow $a'$ so that the cutters D cut the grooves B, B' into the faces of the pieces of stock A, A'. It is understood that by inclining the pieces of stock A, A' toward each other the grooves B, B' stand at angles to the side edges of the stock, as plainly shown in Fig. 5, and the grooves B and B' diverge, as indicated in Fig. 4. It is further understood that when the carriages H, H' are moved forward then the bearings or guideways N, N' carry the eccentrics O, O' and the shafts P, P' along, the said shafts sliding in the bearings Q, Q'.

The grooving machine shown and described is very simple in construction and two pieces of stock are grooved simultaneously with a view to produce pairs of diverging angular grooves in the faces of the two pieces of stock, as above explained.

Having thus described my invention, I claim as new and desire to secure by Letters Patent:

1. A woodworking machine of the class described, comprising a rotary cutter having its axis at an angle relative to the vertical, carriages on opposite sides of the said rotary cutter and each adapted to support a piece of stock, means for moving the said carriages toward and from the said cutters, and means for guiding the carriages longitudinally and at an angle corresponding to that of the said cutter.

2. A woodworking machine of the class described, comprising a rotary cutter having its axis inclined in a longitudinal direction, carriages arranged on opposite sides of the said cutter and adapted to travel longitudinally and transversely toward and from the said cutter, the said carriages being provided with means for holding pieces of stock lengthwise and inclined transversely toward each other, means for moving the carriages toward and from each other, and guiding means for guiding the carriages longitudinally of and at an angle corresponding to that of the said cutter.

3. A woodworking machine of the class described, comprising a rotary cutter having its axis inclined in a longitudinal direction, carriages on opposite sides of the said cutter and extending longitudinally, the carriages having supporting means for holding pieces of stock inclined toward each other, bearings on the said carriages and inclined longitudinally to correspond with the inclination of the said cutter, transverse rods having rollers engaging the said bearings, and means engaging the said carriages for shifting the same transversely toward and from each other.

4. A woodworking machine of the class described, comprising a rotary cutter having its axis inclined in a longitudinal direction, carriages on opposite sides of the said cutter and extending longitudinally, the carriages having supporting means for holding pieces of stock inclined toward each other, bearings on the said carriages and inclined longitudinally to correspond with the inclination of the said cutter, transverse rods having rollers engaging the said bearings, longitudinally-extending shafts, and eccentrics secured on the said shafts and engaging the said carriages for moving the latter transversely toward and from each other.

5. A woodworking machine of the class described, comprising a rotary cutter having its axis inclined in a lengthwise direction, carriages on opposite sides of the said cutter and extending longitudinally, the carriages having supporting means for holding pieces of stock inclined toward each other, bearings on the said carriages and inclined longitudinally to correspond with the inclination of the said cutter, transverse rods having rollers engaging the said bearings, pockets on the said carriages, eccentrics engaging the said pockets, and shafts carrying the said eccentrics and provided with handles for turning the shaft and eccentrics to move the carriages transversely toward and from each other.

6. A woodworking machine of the class described, comprising an inclined cutter, a carriage mounted to travel in the direction of the length of the machine and at an angle corresponding to that of the said cutter, and means for moving the said carriage transversely toward and from the said cutter.

7. A woodworking machine of the class described, comprising an inclined cutter, a carriage mounted to travel in the direction of the length of the machine and at an angle corresponding to that of the said cutter, the carriage having supporting means for the stock to hold the face thereof in an inclined position, and means for moving the said carriage transversely toward and from the said cutter.

In testimony whereof I have signed my name to this specification in the presence of two subscribing witnesses.

JOSEPH J. MARSTALL.

Witnesses:
CARL F. KLUTEY,
G. EDWARD MARSTALL.